US007269658B2

United States Patent
Tao

(10) Patent No.: US 7,269,658 B2
(45) Date of Patent: Sep. 11, 2007

(54) METHOD AND SYSTEM FOR CONNECTING CALLS THROUGH VIRTUAL MEDIA GATEWAYS

(75) Inventor: Sam Xin Tao, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 880 days.

(21) Appl. No.: 10/687,119

(22) Filed: Oct. 16, 2003

(65) Prior Publication Data

US 2005/0085181 A1    Apr. 21, 2005

(51) Int. Cl.
*G06F 13/00*   (2006.01)
(52) U.S. Cl. .............. 709/229; 709/225; 709/249; 370/401
(58) Field of Classification Search ............... 709/223, 709/225, 227, 229, 238, 249; 370/352, 401
See application file for complete search history.

(56) References Cited

U.S. PATENT DOCUMENTS 6,950,441 B1 *  9/2005  Kaczmarczyk et al. ..... 370/467
6,985,734 B2 *  1/2006  Niska ......................... 455/445
7,126,941 B1 * 10/2006  Clemm et al. .............. 370/352
2002/0141386 A1 * 10/2002  Minert et al. ............... 370/352

* cited by examiner

Primary Examiner—Viet D. Vu

(57) ABSTRACT

A method for connecting a call between virtual media gateways within a media gateway, the media gateway including switching facilities and at least two virtual media gateways, wherein each of the virtual media gateways has a corresponding media gateway controller, the method including the steps of receiving a call set-up request in an originating virtual media gateway from its corresponding media gateway controller, creating a shortcut token in the originating virtual media gateway to identify a shortcut in the media gateway, transporting the shortcut token and the call set-up request from the originating virtual media gateway to the terminating virtual media gateway, determining in the terminating virtual media gateway whether the shortcut can be supported, and where the shortcut can be supported by the media gateway, appending call identification information to the shortcut token, returning the shortcut token and the call set-up request to the originating virtual media gateway, and setting up the call using the shortcut.

16 Claims, 11 Drawing Sheets

METHOD AND SYSTEM FOR CONNECTING CALLS THROUGH VIRTUAL MEDIA GATEWAYS

FIELD OF THE INVENTION

The present invention relates generally to the field of telecommunications, and, more particularly, to a method and apparatus for dynamic resource allocation and the connection of calls through virtual media gateways in a media gateway.

BACKGROUND OF THE INVENTION

A single media gateway (MG) chassis may be divided into many smaller virtual media gateways. One type of virtual media gateway has permanent resources, such as TDM (time division multiplex) channels or ATM (asynchronous transfer mode) PVCs (permanent virtual circuit), associated with them. These permanent resources are statically provisioned on the media gateway and are registered with the media gateway controller as semi-permanent terminations in ITU-T H.248 protocol. When these statically provisioned resources need to be used, the media gateway controller instructs the media gateway to manipulate the characteristics of these terminations. However, shared resources, such as IP ports and ATM SVCs (switched virtual circuit) as well as DSPs (digital signal processors), are not provisioned in these virtual media gateways. These resources are dynamically allocated to a task (a voice call normally) when they are needed and then released back to the resource pool after the task is completed. Another type of virtual media gateway does not have any permanent resources statically provisioned because it uses only shared resources. These virtual media gateways without provisioned permanent resources are simply logical entities terminating call control messages and then dynamically allocating and deallocating resources needed for specific tasks (or calls).

Under normal conditions, connections between media gateways are achieved via packet—either IP (Internet Protocol) or ATM—networks, which connect them together. For a call originated and terminated on the same media gateway (intra-MG calls), the bearer traffic is usually routed internally inside the media gateway using its own switching capabilities, either TDM switching or packet switching. However, for a call originated and terminated on two separated media gateways (inter-MG calls), the bearer traffic needs to be routed through external packet networks. The originating media gateway terminates the voice channel where the call is originated. If the originating voice channel is a TDM channel, the originating media gateway will convert the continuous TDM voice stream to discrete packets. The packets are sent from the originating media gateway to the terminating media gateway via a packet (IP or ATM) network. The terminating media gateway then sends the packets to the terminating voice channel. If the terminating voice channel is TDM, the terminating media gateway will convert the discrete packets back to continuous TDM stream. The packet network connecting the media gateways together plays an important role in completing the call.

Where a physical media gateway is divided into multiple virtual media gateways, a call originally viewed as an intra-MG call can be considered as an inter-MG call if the call involves two virtual media gateways. Typically, such calls would be treated as inter-MG calls and would need to go out to external packet networks for connections. Therefore, additional external resources would be needed to complete the task. These additional connections may also cause additional delays. To eliminate the need for additional external resources and the added delay, there is a need in the art for a method and system for connecting calls between virtual media gateways through the use of a special shortcut.

SUMMARY OF THE INVENTION

In accordance with one aspect of the invention, a method for connecting a call between virtual media gateways within a media gateway is provided. The media gateway includes switching facilities and at least two virtual media gateways, wherein each of the virtual media gateways has a corresponding media gateway controller. The method includes the steps of receiving a call set-up request in an originating virtual media gateway from its corresponding media gateway controller, creating a shortcut token in the originating virtual media gateway to identify a shortcut in the media gateway, transporting the shortcut token and the call set-up request from the originating virtual media gateway to the terminating virtual media gateway, determining in the terminating virtual media gateway whether the shortcut can be supported. If the shortcut can be supported by the media gateway, call identification information is appended to the shortcut token, the shortcut token and the call set-up request are returned to the originating virtual media gateway, and the call is set-up using the shortcut.

In accordance with another aspect of the invention, the method further includes setting up TDM terminations and packet terminations for the call in the originating virtual media gateway and in the terminating virtual media gateway. Where the switching facilities are TDM switching facilities, the shortcut is between the TDM terminations on the originating virtual media gateway and the TDM terminations on the terminating virtual media gateway. Where the switching facilities are packet switching facilities, the shortcut is between the packet terminations on the originating virtual media gateway and the packet terminations on the terminating virtual media gateway.

In accordance with yet another aspect of the invention, a system for connecting a call in a media gateway is provided. The system includes a media gateway having switching facilities and at least two virtual media gateways, where each of the virtual media gateways has a corresponding media gateway controller. The system further includes receiving means for receiving a call set-up request in an originating virtual media gateway from its corresponding media gateway controller, creating means for creating a shortcut token in an originating virtual media gateway to identify a shortcut in the media gateway, transporting means for transporting the shortcut token and the call set-up request from the originating virtual media gateway to the terminating virtual media gateway, determining means for determining in the terminating virtual media gateway whether the shortcut can be supported, means for appending call identification information to the shortcut token, means for returning the shortcut token and the call set-up request to the originating virtual media gateway, and means for setting up the call using the shortcut.

In accordance with yet another system of the invention, the system further includes TDM terminations and packet terminations for the call in the originating virtual media gateway and in the terminating virtual media gateway. Where the switching facilities in the system are TDM switching facilities, the shortcut is between the TDM terminations on the originating virtual media gateway and the TDM terminations on the terminating virtual media gateway. Where the switching facilities are packet switching facilities, the shortcut is between the packet terminations on the originating virtual media gateway and the packet terminations on the terminating virtual media gateway.

Still further advantages and benefits of the present invention will become apparent to those of ordinary skill in the art upon reading and understanding the present specification.

BRIEF DESCRIPTION OF THE DRAWINGS

The drawings are only for purposes of illustrating preferred embodiments and are not to be construed as limiting the invention. The invention may take form in various components and arrangements of components, and in various steps and arrangements of steps, preferred embodiments of which will be illustrated in the accompanying drawings.

DETAILED DESCRIPTION OF THE INVENTION

It is to be understood that the specific devices and methods illustrated in the attached drawings, and described in the following specification are simply exemplary embodiments of the inventive concepts defined in the appended claims. Therefore, specific examples and characteristics relating to the embodiments disclosed herein are not to be considered as limiting, unless the claims expressly state otherwise.

Figure 1:
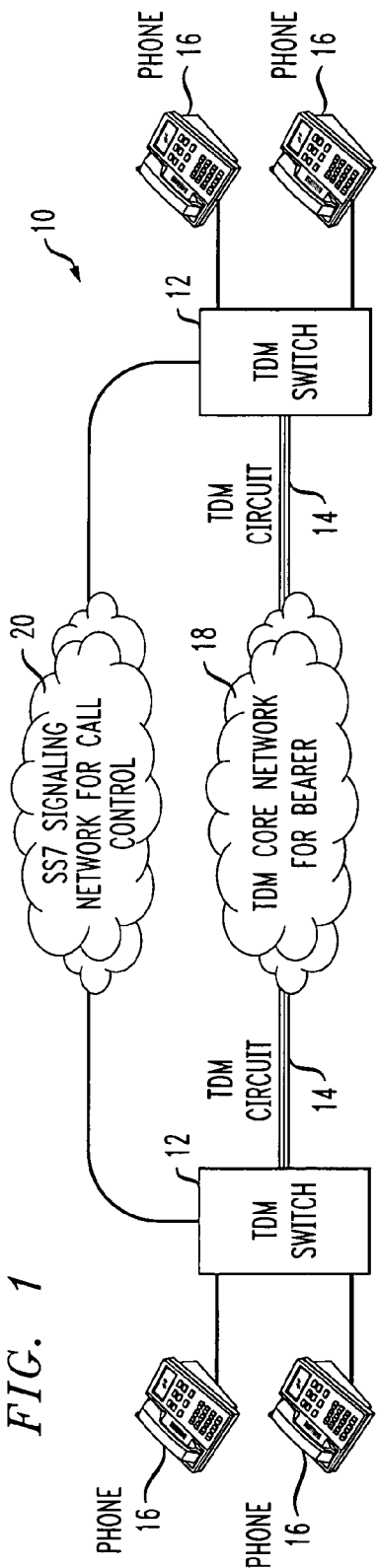
FIG. 1 is a block diagram of a TDM-based transmission network.

Traditionally, voice telephony services have been provided through Time Division Multiplex (TDM) networks. A typical TDM-based transmission network 10 is depicted in FIG. 1. A number of TDM switches 12 are connected together by TDM circuits 14 as a meshed network. Data from communications devices such as telephones 16 is transported over the TDM circuits 14 and through the TDM core network 18. A dedicated end-to-end link is established across the TDM network through multiple TDM switches for each call. The network 10 also includes an SS7 signaling network 20 for call control. Data is transmitted whether a caller is talking or not. There is typically no media conversion as well as minimal bearer path delay.

Figure 2:
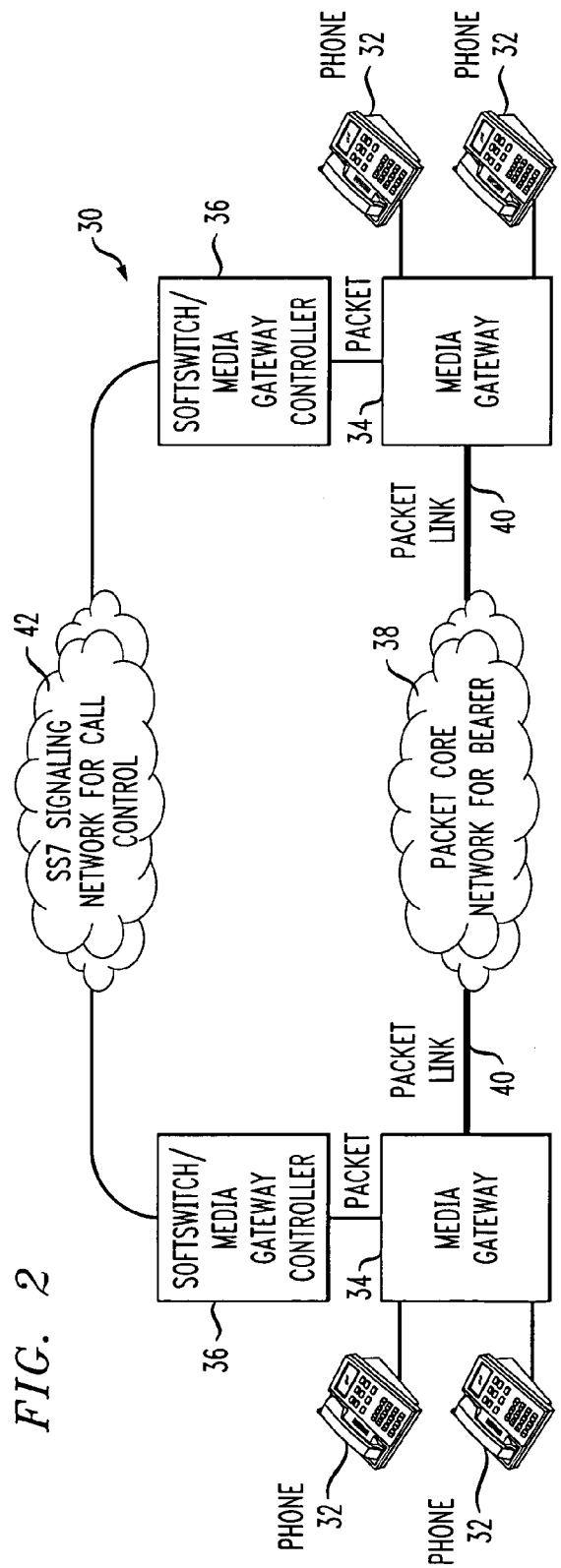
FIG. 2 is a block diagram of a packed-based transmission network.

Digitized voice can also be transported over packet networks such as Internet Protocol (IP) or Asynchronous Transfer Mode (ATM) networks. A typical packed-based transmission network 30 is depicted in FIG. 2. Voice data from communications devices such as telephones 32 is converted from continuous TDM streams to discrete packets (or cells) in one or more media gateways (MG) 34, which are controlled by a media gateway controller (MGC) 36 such as a Lucent Softswitch. Voice packets are transported over a packet core network 38. The packet network 30 is connected together with hop-to-hop packet links 40. The network 30 also includes an SS7 signaling network 42 for call control. Packets are routed through the network 30 based on the destination address and network conditions. No dedicated end-to-end link is needed for a voice call. The paths traveled by the packets from one point to another point may be different. Packets for different calls travel on the same link according to the arrival order and priority. Digitized voice packets can be compressed to save transmission bandwidth. With silence suppression, no data is transmitted when the user is not talking. Compared to the TDM-based core network, a packet-based core network typically costs less to build and maintain and is more efficient. The media conversion (TDM-to-packet) introduces some bearer delay.

With continued reference to FIG. 2, the MG 34 has various roles. For instance, it may be used to terminate different media (e.g., TDM, IP or ATM) carrying data. In particular the MG 34 converts the media where the digitized voice is transported from one type (e.g., TDM) to another (e.g., IP or ATM). The MG 34 also converts the method by which the digitized voice is encoded from one codec (e.g., G.711) to another (e.g., G.726, G.729, or AMR). The MG 34 may also be used to manipulate the content of the data. That is, it may be used to cancel the echo usually caused by analog to digital conversion and delay, compress the data to save transmission bandwidth, and suppress the silence to reduce the amount of data that need to be transmitted. Additionally, the MG 34 may also switch data from one channel to another channel (e.g., TDM-to-packet) to provide the connection for a specific session (a call or a data link).

The MG 34 is controlled by the MGC 36 using media gateway control protocol (e.g., H.248, MGCP, etc.) for setting up voice calls. Under H.248, each media gateway can only be controlled by one media gateway controller. A single media gateway controller can control multiple media gateways. The properties of the bearer are described in the call control message with Session Description Protocol (SDP).

Figure 3:
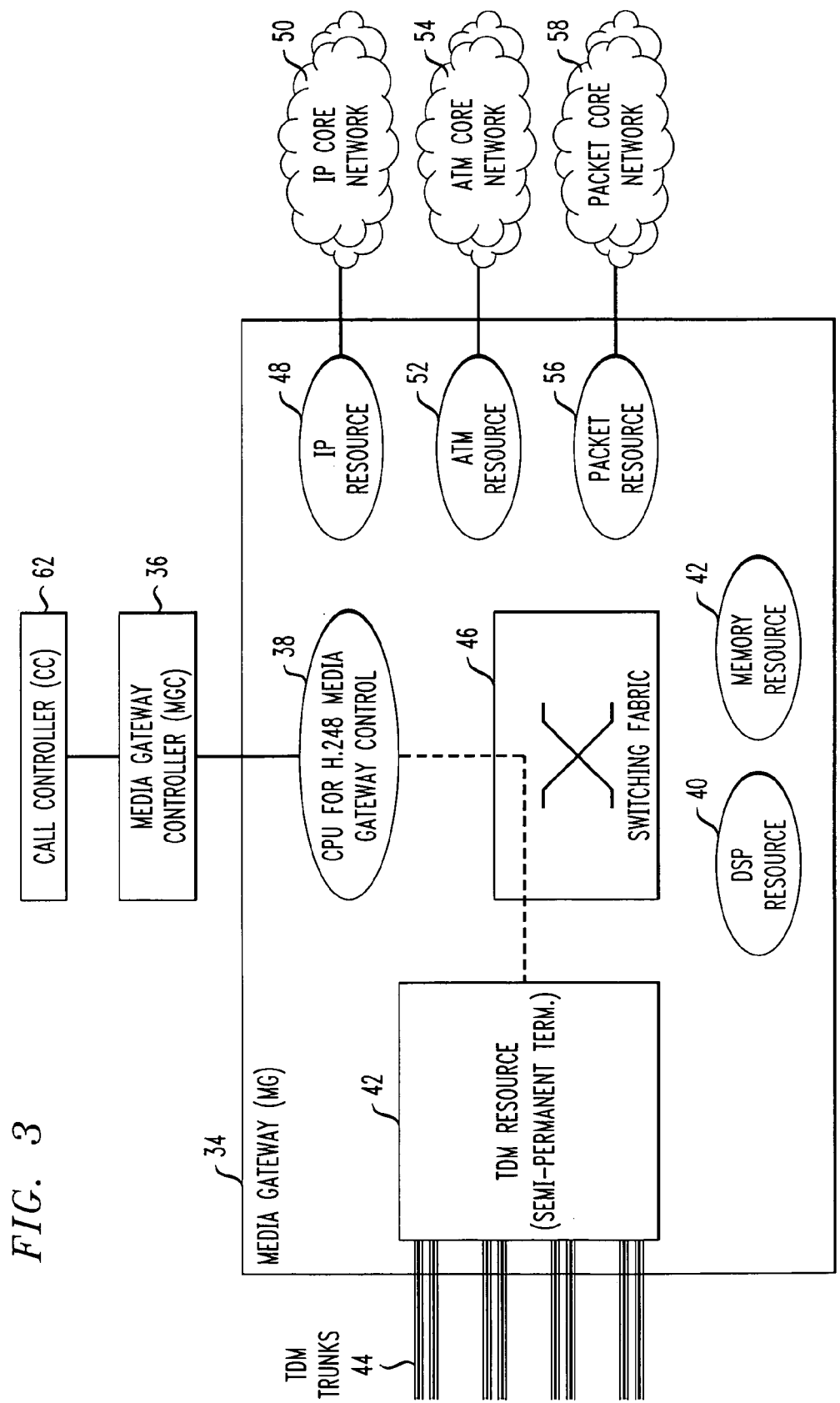
FIG. 3 is a block diagram of the resources and controls in a media gateway.

As illustrated in FIG. 3, the MG 34 has a set of resources for processing calls and manipulating bearer (voice) data. The resources that are commonly provisioned on the MG 34 include a CPU 38 for H.248 media gateway control and a CPU 40 for digital signal processing (DSP); memory 42 for storing call related information; TDM resources 44 for terminating TDM links 46; a switching fabric 48 to switch TDM streams from one time slot to another time slot and to switch packets from one packet interface to another packet interface; IP resources 50 for terminating and transmitting packetized voice over an IP network 52; ATM resources 54 for terminating and transmitting packetized voice over an ATM network 56; and other packet resources 58 for terminating and transmitting voice over an packet network 60. The MG 34 is in communication with the MGC 36 as well as a call controller 62.

Some physical resources are statically and semi-permanently provisioned in the media gateway and the media gateway controller for specific voice channels. There is a one-to-one relationship between physical components on the MG 34 and their logical representations in the MGC 36. The logical representation of the resource exists whether it is used or not. The resource cannot be used by calls not associated with the channel.

Some physical resources are assigned temporarily to a call on the MG 34 while a call is in progress. These resources are shared by all calls on the MG 34. The logical representations of these resources do not exist on the MG 34 and the MGC 36 before the resources are used for a call. The resources are acquired from the resource pool during the call setup. The logical representations of the resources are created dynamically by the media gateway when they are needed for a call. The MGC 36 has no knowledge of resource allocation on the MG 34. Once the call is complete, the resources are released back to the resource pool for future use and the logical representations of the resources are deleted.

Resources for voice calls are represented in H.248 media gateway control protocol as terminations. A connection for a call in the MG 34 and the MGC 36 is represented by a context. Semi-permanent terminations represent resources provisioned statically and existed independent of utilization of these resources on the MG 34. The logical representations of semi-permanent terminations are also provisioned in the MGC 36. Allocations of semi-permanent terminations are controlled by the MGC 36. Ephemeral terminations represent resources allocated dynamically by the MG 34 during the setup of the calls. The logical presentations of ephemeral terminations do not exist in the MG 34 and in the media gateway controller 36 until they are created for a call in the MG 34. TDM terminations are semi-permanent, while IP or ATM terminations are ephemeral. The characteristics of the bearer connection are specified in the H.248 message during the setup of terminations using the Session Description Protocol (SDP).

Figure 4:
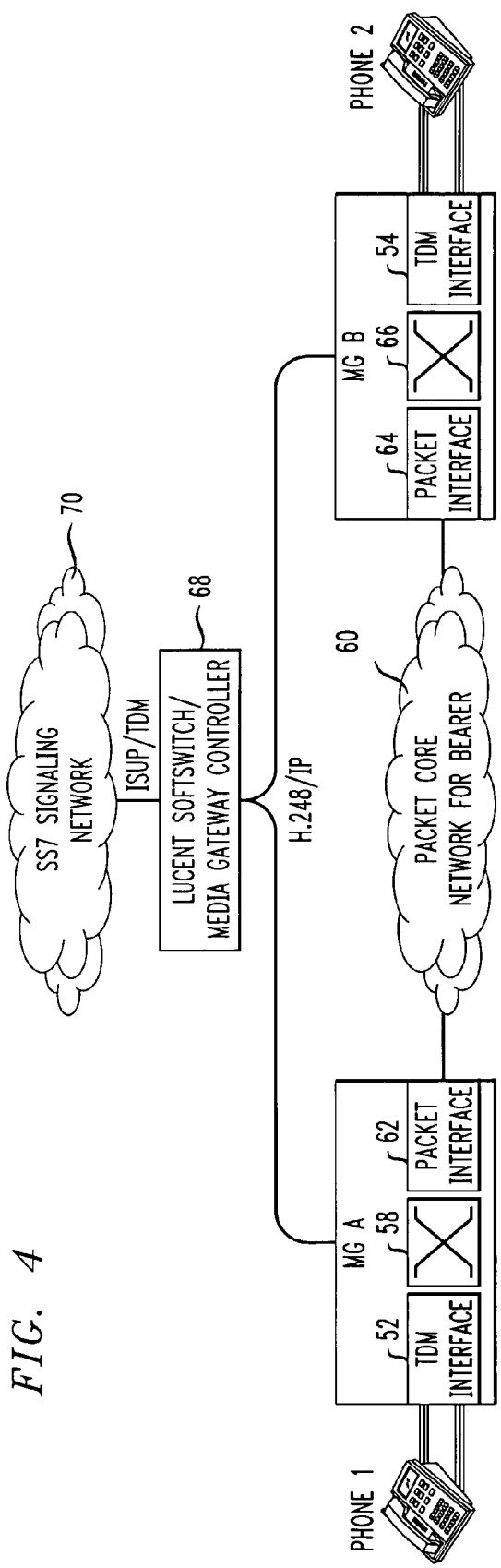
FIG. 4 is a block diagram of the physical connections for an inter-MG call.

FIG. 4 shows the physical connections for an inter-MG call. A call originating from a first telephone 50 and coming in on a TDM circuit 52 terminated on a first media gateway MG A and then going out on a TDM circuit 54 terminated on another media gateway MG B to a second telephone 56 is considered an inter-MG TDM-to-TDM call. At the originating MG A, the continuous TDM stream is converted to discrete packets (IP or ATM) using a digital signal processor (DSP) and transported through the switching fabric 58. The packets are then sent out to the packet core network 60 via the packet (IP or ATM) interface 62 on MG A. The packetized data is transported through the packet core network 60 to a packet interface 64 on the terminating media gateway, MG B. At the MG B, the discrete packets are reassembled as a continuous TDM stream using a DSP and transported through the switching fabric 66. The packets are then transmitted to the TDM circuit and on to the end user. The media gateways MG A and MG B are controlled by a media gateway controller 68, which is communication with the SS7 switching network 70.

Figure 5:
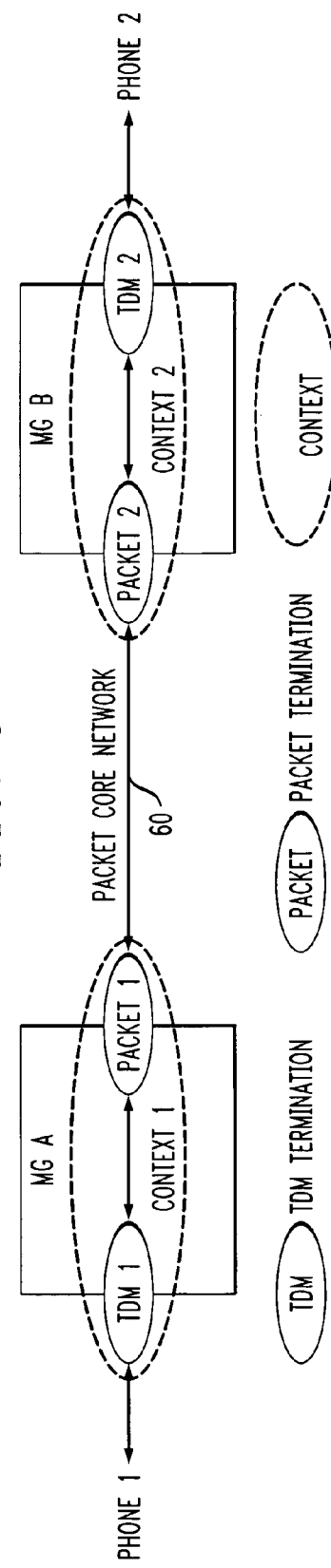
FIG. 5 is a block diagram of the logical links for an inter-MG call.

FIG. 5 shows the logical links for an inter-MG call. The TDM circuits on the originating and terminating media gateways MG A and MG B are represented by TDM terminations, TDM 1 and TDM 2, respectively. Packet connections between the media gateways MG A and MG B and the packet core network 60 are represented by packet terminations Packet 1 and Packet 2. The call on the originating and the terminating media gateways MG A and MG B is represented by the contexts, Context 1 and Context 2.

Figure 6:
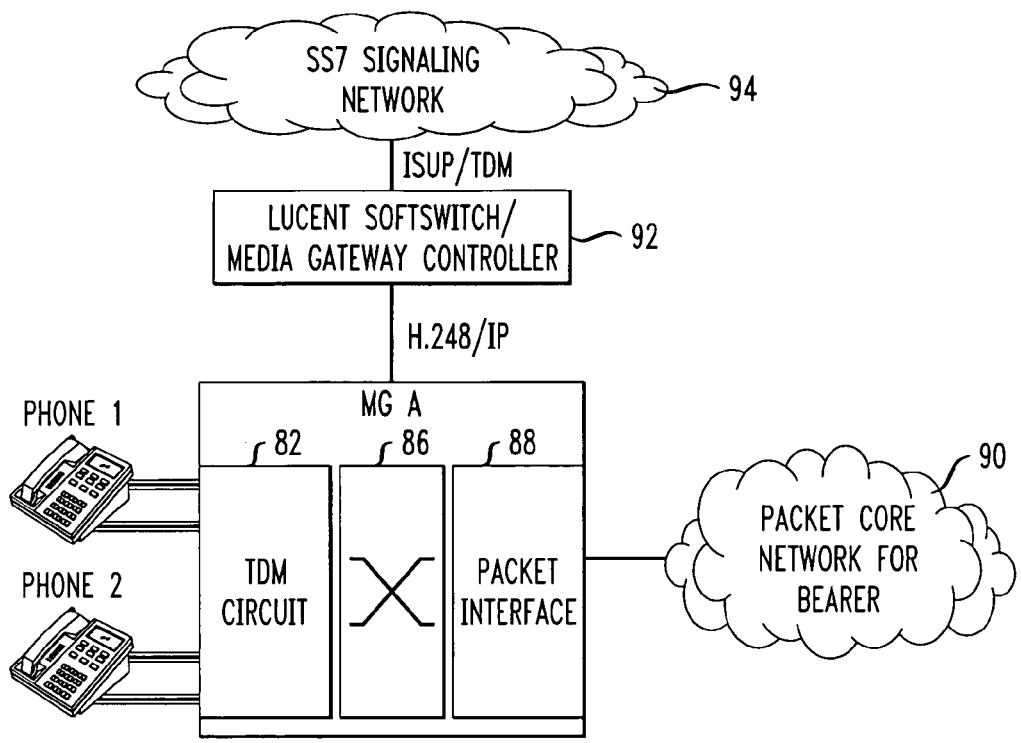
FIG. 6 is a block diagram of the physical connections for an intra-MG call.

A call coming in on a TDM circuit and going out on another TDM circuit both terminated on the same media gateway (e.g., MG A) is known as an intra-MG TDM-to-TDM call. FIG. 6 shows the physical connections for a typical intra-MG call. A call originating from a first telephone 80 and coming in on a TDM circuit 82 terminated on a media gateway MG A may go out on the same TDM circuit 82 to a second telephone 84. On a media gateway capable of TDM switching using TDM switching fabric (e.g., TSI), the TDM circuits can be directly connected without using the switching fabric 86 or going through the packet interface 88 and the packet core network 90. The MG A is controlled by a media gateway controller 92, which is communication with the SS7 switching network 94. Bearer path delay can be minimized without packetization. DSP resources can be saved because no additional data manipulations are needed. Packet resources can be saved because the data do not need to be transmitted on to the packet core.

Figure 7:
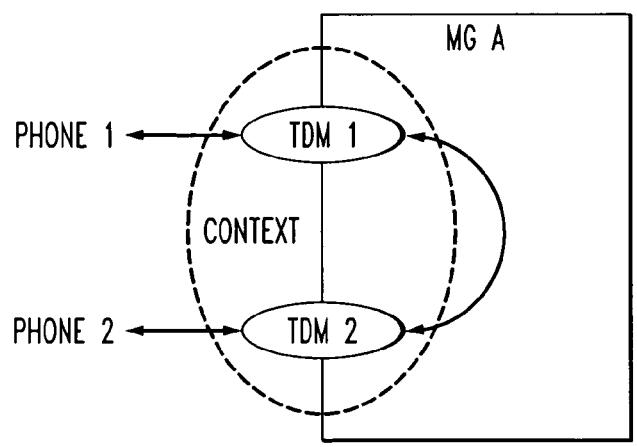
FIG. 7 is a block diagram of the logical links for an intra-MG call.

FIG. 7 shows the logical links for an intra-MG call. In FIG. 7, the originating and terminating TDM circuits on MG A are represented by TDM terminations TDM 1 and TDM 2. The TDM terminations are directly linked together using TDM switching fabric in MG A. The call between the telephones 80 and 84 on the MG A is represented by the context, Context 1. However, the call scenarios described in previous paragraphs for inter-MG and intra-MG calls are not limited to TDM-to-TDM. For example, in wireless applications, the incoming and outgoing voice channels can be ATM AAL2 PVCs. But the same principle applies.

Figure 8:
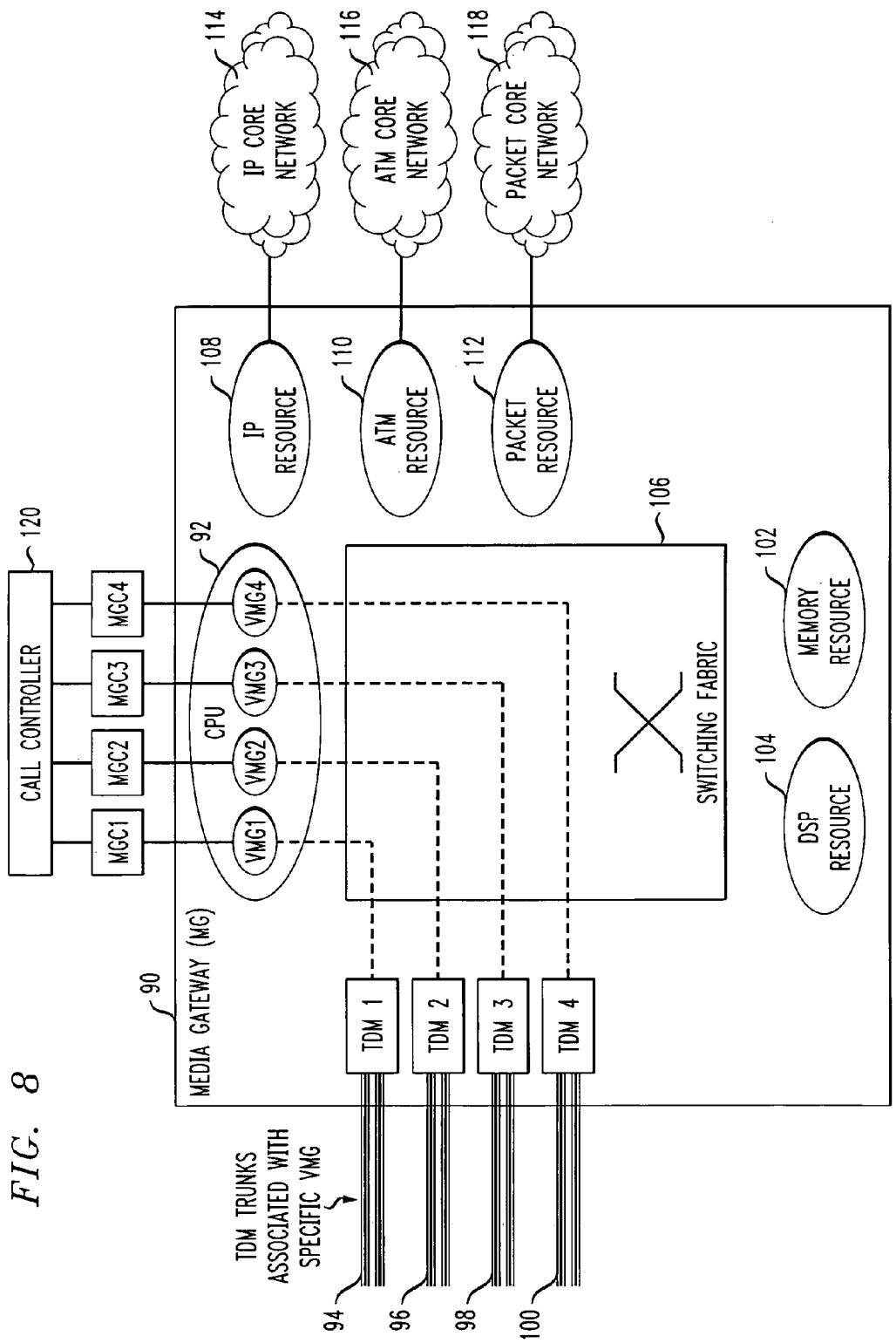
FIG. 8 is a block diagram of the resources and controls in association with virtual media gateways.

As shown in FIG. 8, a single media gateway 90 may be divided into multiple, logically separated, virtual media gateways. In this case, four virtual media gateways, VMG1, VMG2, VMG3, and VMG4, are shown, but it is to be appreciated that any number of VMGs may be created. Each VMG has its own corresponding media gateway control MGC1, MGC2, MGC3, and MGC4 (using H.248 or other media gateway control protocols) instance running on a centralized CPU 92 (or on distributed CPUs). Each virtual media gateway is considered, logically, as a separate media gateway by the media gateway control. Semi-permanent resources are partitioned among all the VMGs and are mapped on the MGC associated with each VMG. The resources are statically provisioned on both the VMG and on the corresponding MGC controlling the VMG. Once allocated, the resources cannot be moved from one VMG to another VMG without reconfiguring the system. The resources are dedicated to each VMG and cannot be shared among the VMGs. The TDM trunks 94, 96, 98, 100 are examples of resources dedicated to each virtual media gateway. Dynamically allocated resources are shared among all VMGs on the whole physical MG. A CPU 92, memory 102, DSP 104, switching fabric 106, IP interfaces 108, ATM interfaces 110, packet interfaces 112, an IP core network 114, an ATM core network 116, a packet core network 118, and a call controller 120 are examples of the shared resources.

A TDM-to-TDM call between two VMGs on the same physical MG is considered to be the same as an inter-MG call by the MGC because VMGs are considered to be separate MGs. Typically, inter-MG calls are processed as voice-over-packet (VoP) calls using packet resources and with TDM-to-packet conversion, wherein bearer path delays are introduced. The packet resources 108, 110, and 112 can be internal on the same physical media gateway. External packet resources 114, 116, and 118 may also be involved.

Figure 9:
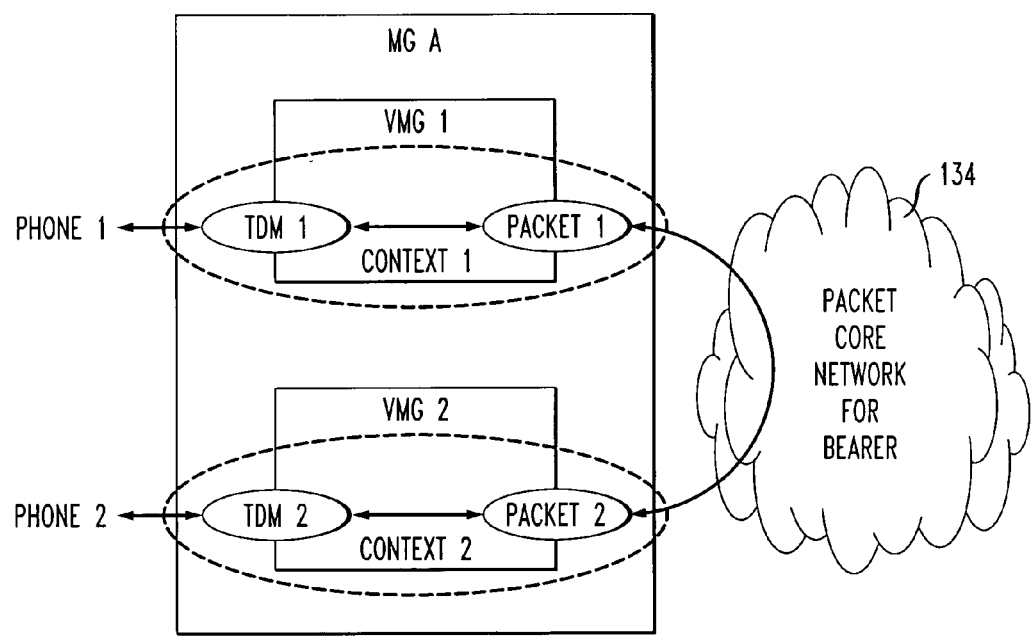
FIG. 9 is a block diagram showing the logical links for an inter-VMG call.

FIG. 9 shows the logical links for a typical inter-VMG call between a first telephone 130 and a second telephone 132.

In FIG. 9, the TDM circuits on the media gateway MG A are represented by TDM terminations, TDM 1 and TDM 2, where TDM 1 is on the virtual media gateway VMG 1 and TDM 2 is on the virtual media gateway VMG 2. The packet connections between the virtual media gateways VMG 1 and VMG 2 are represented by a pair of packet terminations, Packet 1 and Packet 2. The call on media gateway MG A is represented by the contexts, Context 1 and Context 2. Even though the VMGs are located on the same MG, the call would still go through the packet core network 134. Thus, an inter-VMG call would have the same call flow as a regular inter-MG call. The call flow for the setup and clearing of an inter-MG call is shown in FIGS. 10 and 11.

Figure 10:
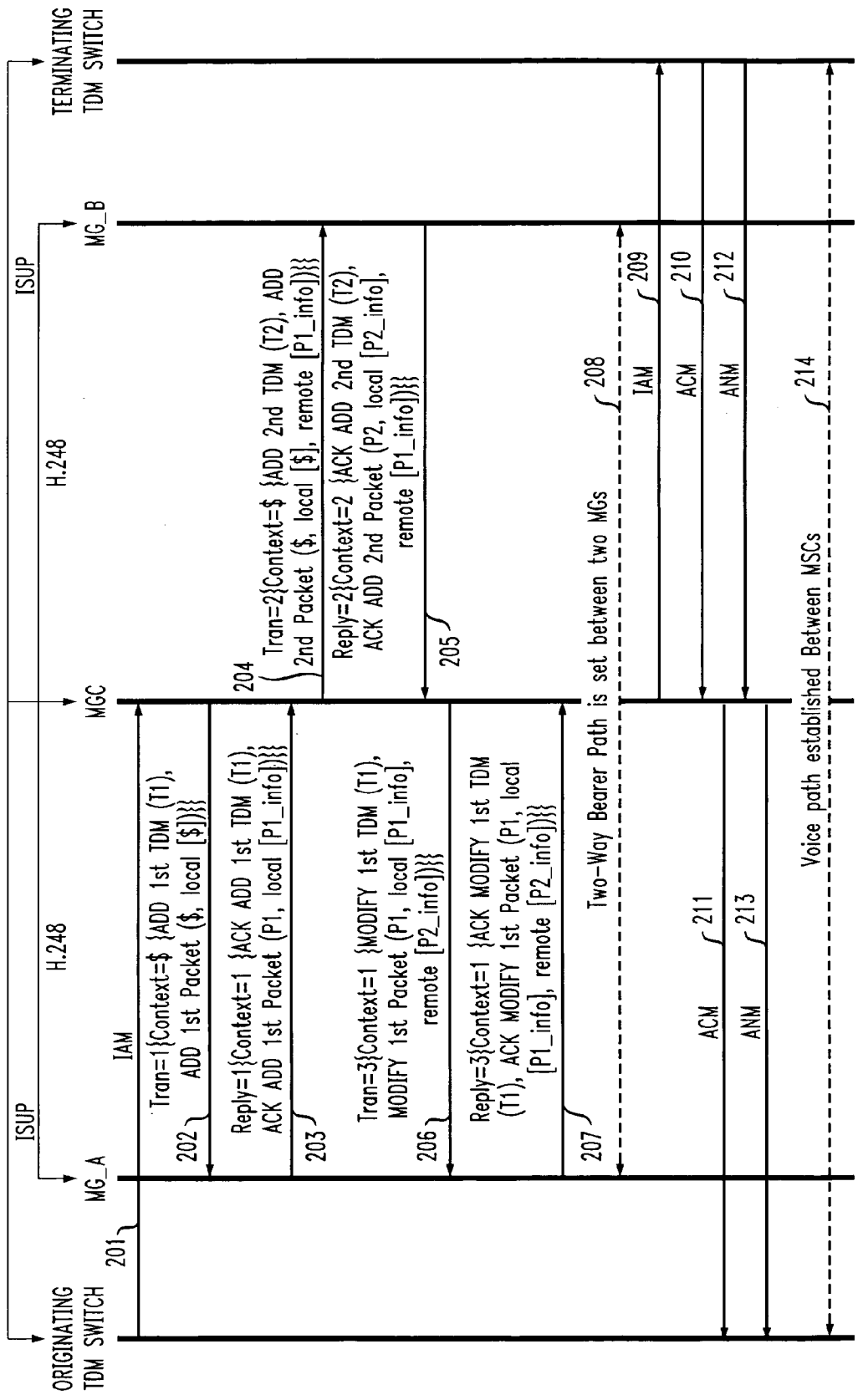
FIG. 10 is a call flow diagram for an inter-MG VoP call setup.
Figure 11:
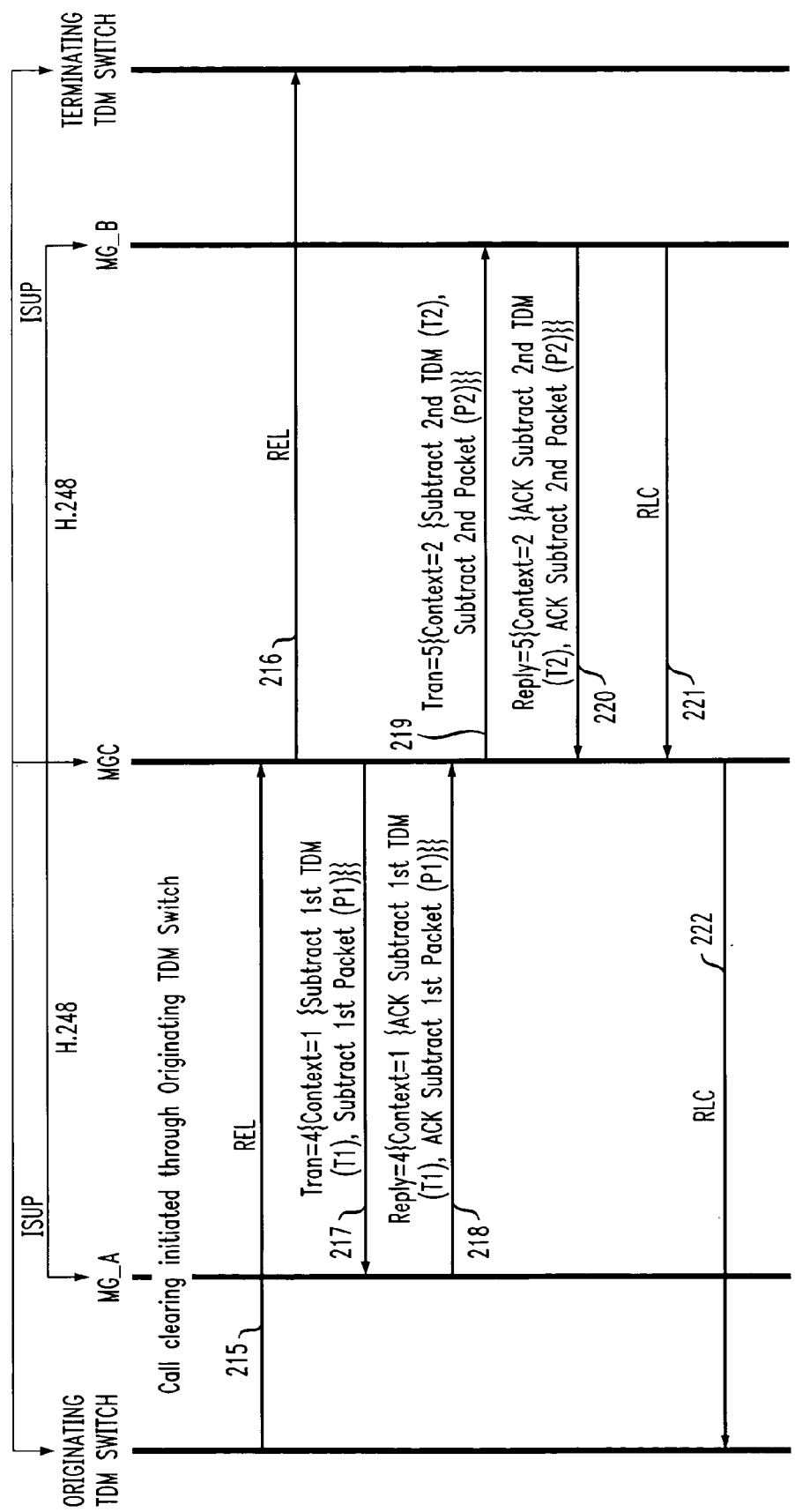
FIG. 11 is a call flow diagram for an inter-MG VoP call clearing.

The call flow for an inter-MG VoP call setup is illustrated in FIG. 10, with reference to FIGS. 4 and 5. Initially, the originating side sends a SS7 ISUP request to the MGC/softswitch 68 for call set up (201). After the MGC 68 processes the request, the MGC instructs the originating media gateway MG A to activate the semi-permanent TDM termination (TDM 1), which represents the originating voice channel, and creates a packet termination for connections to the terminating media gateway MG B (202). Upon receiving the request from the MGC 68, the MG A creates the Context (Context ID=1) with the TDM termination TDM 1 and the packet termination Packet 1 in it (203). Then the MG A sends the acknowledgement back to the MGC with the information of packet termination Packet 1 that is just created on MG A. Upon receiving the reply from the MG A with the information of packet termination Packet 1, the MGC instructs the MG B where the terminating voice channel is provisioned to activate the terminating TDM termination TDM 2 and creates the packet termination Packet 2 for connection to Packet 1 on the MG A (204). The MG B creates the Context (Context ID=2) with the TDM termination TDM 2 and the packet termination Packet 2 in it. With the information of Packet 1, the connection from Packet 2 to Packet 1 is established. MG B acknowledges that the set up is complete and sends the information of P2 back to MGC (205).

The MGC 68 passes the information about Packet 2 to the MG A for establishing the connection from Packet 1 to Packet 2 (206). At this step, the MGC 68 also instructs the MG A to allow two-way traffic. Using the information received from the MGC, the MG A establishes the link from Packet 1 to Packet 2 and makes two-way traffic possible (207). The MG A sends the reply back to the MGC to acknowledge the action. At this point, the two-way communication channel has been established (208). It is ready for passing the data between two media gateways now.

The MGC 68 notifies the terminating TDM switch 66 that the call is coming (209). The terminating TDM switch 66 acknowledges the incoming call and notifies the MGC 68 that it is setting up the call to next hop (210). Upon receiving the acknowledgement from the terminating TDM switch 66, the MGC 68 notifies the originating TDM switch 58 that the call is being set up (211). The terminating party answers the call and the terminating switch notifies the MGC 68 that it is ready for bearer traffic (212). The MGC 68 notifies the originating switch 58 that the terminating party is ready (213). Upon receiving the message from the MGC 68, the originating switch 58 makes the end-to-end two-way communication channel available (214). The users can talk to each other now.

The call flow for inter-MG VoP call clearing is illustrated in FIG. 11 with continuing reference to FIGS. 4 and 5. The originating party hangs up the phone and terminates the call. Upon receiving the hang-up signal from the phone, the originating switch notifies the with reference to the MGC 68 that the call has ended and the resources used for the can be released (215). Upon receiving the release message from the originating switch 58, the MGC 68 notifies the terminating side that the call has ended and the resources associated with the call on terminating switch can be released (216). The MGC 68 also notifies the MG A and the MG B to release resources associated with the call (217, 219). The MG A and the MG B acknowledge back after releasing the resources, respectively (218, 220). Upon releasing it resources, the terminating switch notifies the MGC 68 that the task has been completed (221). The MGC 68 notifies the originating side that the task of releasing resources associated with the call is complete (222). This call flow also applies to inter-VMG calls, i.e., the calls originated and terminated on two different VMGs in the same physical media gateway.

In accordance with the present invention, it is possible, however, to create a shortcut between the voice channels on the two separate VMGs using resources on the physical media gateway, such as TDM or packet switching fabric, shared by the VMGs, whereby such a call would not need to go through the external packet network. In order to create such a shortcut, (1) the VMGs will need to know that they are both on the same physical media gateway; (2) each VMG will need to know the voice channel used by the other virtual media gateway terminating the call; and (3) the physical MG will need to know the information about the voice channels for connecting them directly via the switching fabric.

Figure 12:
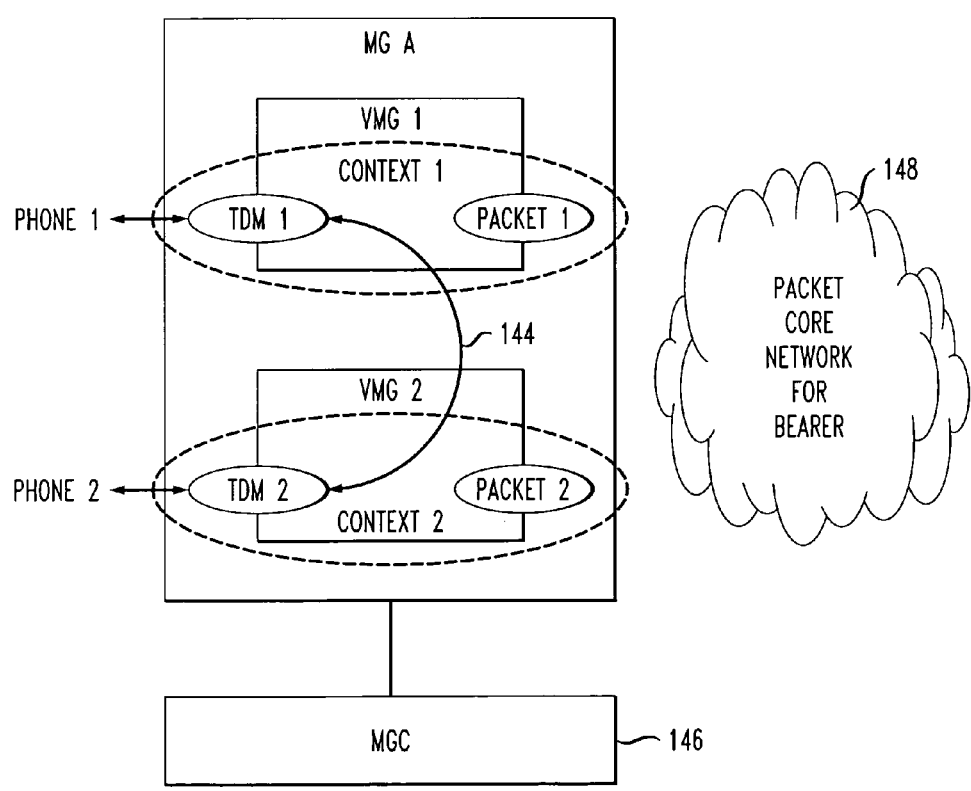
FIG. 12 is a block diagram showing the logical links for an inter-VMG call with the shortcut according to the present invention.

FIG. 12 shows the connections for an inter-VMG call between a first telephone 140 and a second telephone 142 by means of a shortcut. The TDM circuits on the media gateway MG A are represented by the TDM terminations, TDM 1 and TDM 2, where TDM 1 is on the virtual media gateway VMG 1 and TDM 2 is on the virtual media gateway VMG 2. The packet connections between the virtual media gateways VMG 1 and VMG 2 are represented by the packet terminations Packet 1 and Packet 2. The call on the media gateway MG A is represented by the contexts, Context 1 and Context 2. However, a shortcut 144 between the TDM terminations on the separate VMGs may be created using the shared switching fabric for an inter-VMG call. The MG A is controlled by the MGC 146. With this shortcut 144, the call does not need to be routed through the packet core network 148. This shortcut can also be between the packet terminations if there is a packet switching facility but no TDM switching facility available. In this case, no external packet switching resources are needed.

Figure 13:
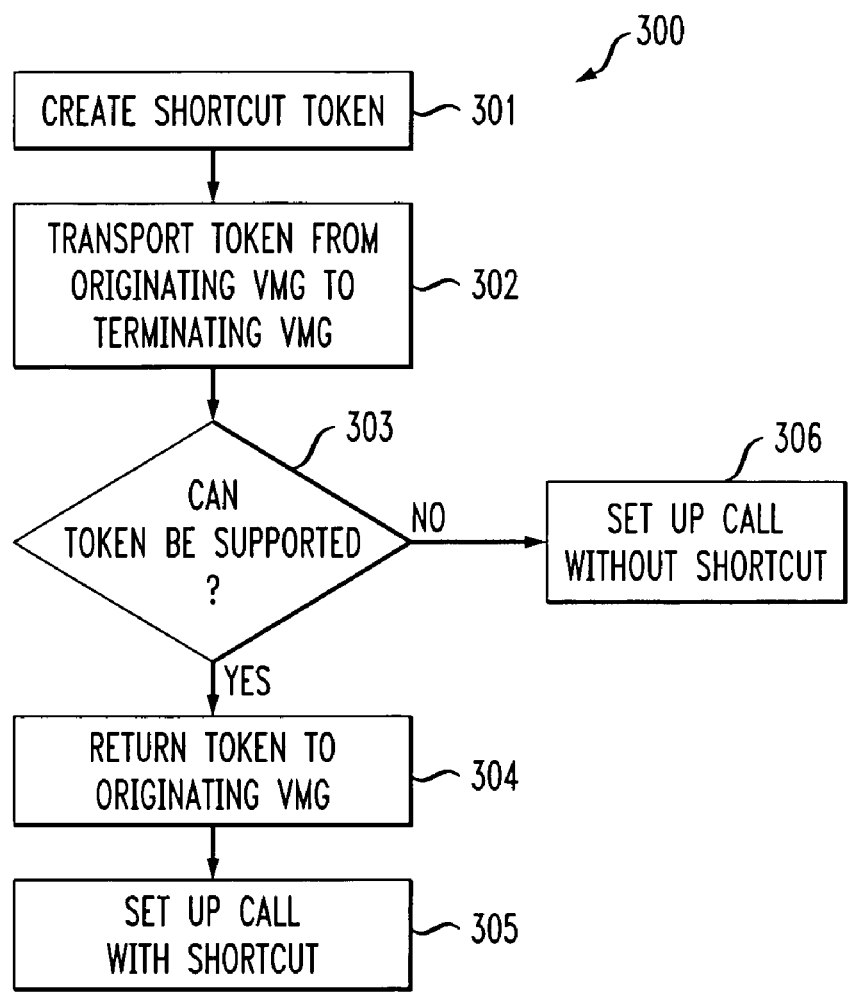
FIG. 13 is a block diagram of a method for creating a shortcut for an intra-VMG call.

FIG. 13 illustrates a flowchart describing a method 300 of creating the shortcut between the voice channels on separate virtual media gateways within a physical media gateway as shown in FIG. 12. The method 300 can be implemented as a software program routine executable in a CPU in the MG A.

Turning now to the method 300, in step 301 a special "shortcut token" is created to identify the VMGs and to enable the shortcut. The token is generated in the originating VMG where the call is initiated. The token may be passed between the originating and terminating VMGs in the MG where the call is terminated using the MGC with out-band call control messages with media gateway control protocol such as H.248.

The preferred format of the shortcut token is: <Physical-MG-ID>:<VMG1-ID>:<Virtual-Channel-ID>[:<VMG2-ID>:<Virtual-Channel-ID>], where <Physical-MG-ID> is an ASCII stream uniquely identifying the physical MG in the network—could be the name or the IP address of the physical MG;

<VMG1-ID> is an ASCII stream uniquely identifying the originating VMG in the physical MG—it could be a name or the IP address of the VMG that the instance of the media gateway control protocol (e.g., H.248) is run;
<Virtual-Channel-ID> is an ASCII stream (text or number) uniquely identifying the call in the originating VMG; and
the fields in the [] are appended by the terminating VMG if both VMGs are in the same physical MG and the shortcut can be created.

Some specific examples of the shortcut token are presented in Table

TABLE 1

| Originating | Reply |
|---|---|
| MG-Naper:VMG-12:24566 | MG-Naper:VMG-12:24566:VMG-13:15654 |
| MG-135168001211:VMG-12:5FF6 | MG-135168001211:VMG-12:5FF6:VMG-13:3D26 |
| MG__87A801D3:VMG-87A8020C:C24566 | MG__87A801D3:VMG=87A8020C:CALL24566:VMG-87A8020D:3D26 |

Under H.248 protocol, the token is transported from the originating VMG to the terminating VMG as one of the parameters carried in the SDP message body (step 302). The terminating VMG determines whether the shortcut can be supported (step 303). If so, the token is returned to the originating VMG via an H.248 message after the terminating VMG appends its VMG-ID and Virtual-Channel-ID (step 304), and the call is set-up (step 305). If not, in step 306, a regular call without the shortcut as described above will be set up.

Figure 14:
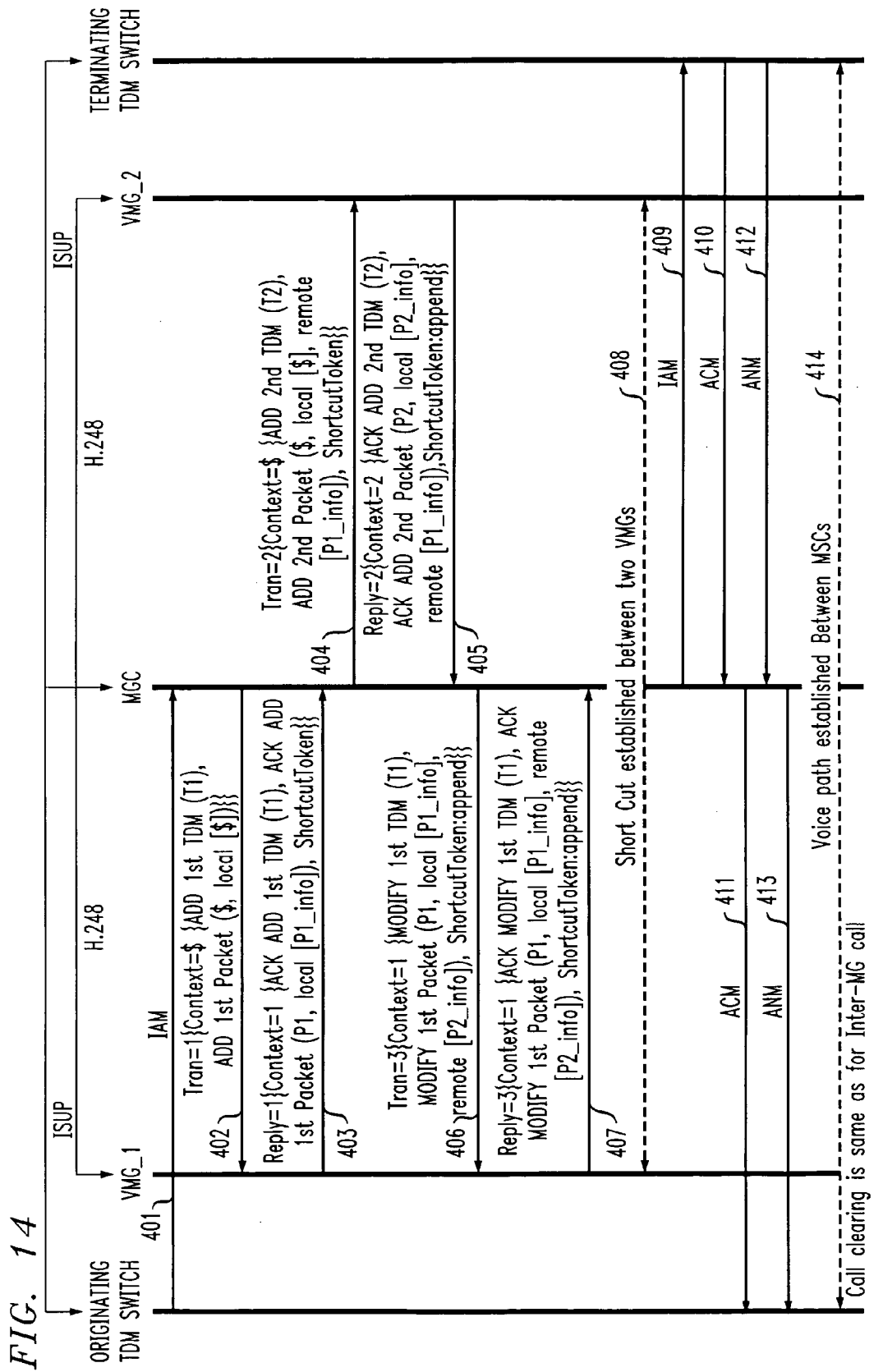
FIG. 14 is a call flow diagram for an intra-VMG call with the shortcut according to present invention.

The call flow for an intra-VMG call with a shortcut is shown in FIG. 14, with reference to FIG. 13. The steps involved in setting up an inter-VMG call with the shortcut are similar to those for setting up an inter-MG call, which was discussed earlier.

The intra-VMG call is set up as a normal inter-MG call, including send an IAM (initial address message) to the MGC (401). After receiving the initial setup request from the MGC (402), the VMG 1 sends an acknowledgement to the MGC (403). Besides creating the TDM termination and the packet termination used for normal inter-MG voice over packet call requested by the MGC, the originating MG creates the shortcut token and sends it back to the MGC as part of the response to the original setup message.

The MGC includes the token as part of the call setup message and sends the token with other call setup messages to the terminating VMG (404). Upon receiving the call setup message and the token, the terminating VMG creates the TDM termination and the packet termination used for normal inter-MG voice over packet call requested by the MGC and then decides if the call is originated from a VMG in the same physical MG based on the <Physical-MG-ID>.

If the call is from a different physical MG, a normal voice over packet procedure is used. The terminating VMG can either discard the shortcut token without return it in the reply message or return the token without any change. The VMGs will proceed with setting up a normal voice over packet call.

If the terminating VMG determines that the token is from a VMG in the same MG, the terminating VMG will create the context and add a TDM termination and a packet termination as required for normal inter-MG voice over packet call. Then the terminating VMG will append its VMG ID and the virtual channel ID to the token. The token is sent back as part of the reply message (405).

Upon receiving the reply from the terminating VMG, the MGC passes the information for bearer from the terminating VMG and the token to the originating VMG (406). The originating VMG updates the properties of the remote termination based on the information provided by the terminating VMG and determines if a shortcut is being created.

If the originating VMG realizes that the shortcut token has been appended with the terminating VMG ID and Virtual Channel ID, then the shortcut is being created and used. Otherwise, if there is no short cut token being returned or the returned short cut token has not been modified with a valid VMG ID and Virtual Channel ID, the shortcut will not be created.

The originating VMG sends the acknowledgement back to the MGC (407) and creates the two-way link, with or without the shortcut, between the two VMGs (408). In the case without the shortcut, the procedure is similar to what has been discussed earlier. To create the link between the VMGs with the shortcut, the shared resources on the physical MG are utilized and the shortcut between those two TDM channels cross the VMGs is created. The data is directed to use the shortcut.

This shortcut can be between the TDM terminations using TDM switching facilities or between the packet terminations using packet switching facilities. The difference is that types of resources used to create the shortcut are different. If a shortcut is created using TDM switching facility, then the voice channel may not need to go through the steps of packetization. This may lead to less delay and better voice quality. If the short cut is created using packet switching facility, then the DSPs are still needed to packetize voice streams. However, external packet switching facilities can be saved. The implementation of the shortcut depends on the media gateway hardware. The rest of the call flow (409-414), as well as call clearing, is the same as for an inter-MG call.

To summarize, TDM-to-TDM calls between two virtual media gateways on one physical media gateway are normally treated as calls between two physically separated media gateways. Continuous TDM streams are packetized and transmitted from one virtual media gateway to another. More CPU (DSP) resources are needed for packetization. Bearer path delays are introduced due to TDM-to-packet conversion. However, a shortcut token may be introduced to allow the creation of a TDM-to-TDM shortcut for a call between the virtual media gateways. The token is generated at the originating virtual media gateway, passed between the virtual media gateways via media gateway control protocol. The terminating virtual media gateway appends its own identity to the token if a shortcut is possible. The shortcut is created using switching resources available to the whole media gateway but not used for inter-VMG calls. The inter-VMG call flows are similar to normal inter-MG calls, except for the token carried by the media gateway control protocol as additional information about the bearer (in SDP).

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. In a media gateway having switching facilities and at least two virtual media gateways, wherein each of the virtual media gateways has a corresponding media gateway controller, a method for connecting a call between virtual media gateways within the media gateway, comprising the steps of:
   receiving a call set-up request in an originating virtual media gateway from its corresponding media gateway controller;
   creating a shortcut token in the originating virtual media gateway to identify a shortcut in the media gateway;
   transporting the shortcut token and the call set-up request from the originating virtual media gateway to the terminating virtual media gateway;
   determining in the terminating virtual media gateway whether the shortcut can be supported;
   where the shortcut can be supported by the media gateway,
      appending call identification information to the shortcut token,
      returning the shortcut token and the call set-up request to the originating virtual media gateway,
      setting up the call using the shortcut.

2. The method defined in claim 1, wherein the determining step includes determining whether the shortcut token is from a virtual media gateway in the same media gateway as the terminating virtual media gateway.

3. The method defined in claim 1, further comprising the steps of:
   where the shortcut cannot be supported by the media gateway,
      returning the call set-up request to the originating virtual media gateway,
      setting up the call without the shortcut and through a packet core network.

4. The method defined in claim 1, further comprising the step of setting up a plurality of TDM terminations and a plurality of packet terminations for the call in the originating virtual media gateway and in the terminating virtual media gateway.

5. The method defined in claim 4, wherein the switching facilities comprise TDM switching facilities.

6. The method defined in claim 5, wherein the shortcut is between the TDM terminations on the originating virtual media gateway and the TDM terminations on the terminating virtual media gateway.

7. The method defined in claim 4, wherein the switching facilities comprise packet switching facilities.

8. The method defined in claim 7, wherein the shortcut is between the packet terminations on the originating virtual media gateway and the packet terminations on the terminating virtual media gateway.

9. The method defined in claim 1, wherein the transporting step further comprises transporting the shortcut token from the originating virtual media gateway to the terminating virtual media gateway as one of the parameters carried in the SDP message body under H.248 protocol.

10. A system for connecting a call in a media gateway, comprising:
   a media gateway having switching facilities and at least two virtual media gateways, each of the virtual media gateways having a corresponding media gateway controller,
   receiving means for receiving a call set-up request in an originating virtual media gateway from its corresponding media gateway controller;
   creating means for creating a shortcut token in an originating virtual media gateway to identify a shortcut in the media gateway;
   transporting means for transporting the shortcut token and the call set-up request from the originating virtual media gateway to the terminating virtual media gateway;
   determining means for determining in the terminating virtual media gateway whether the shortcut can be supported;
   means for appending call identification information to the shortcut token;
   returning means for returning the shortcut token and the call set-up request to the originating virtual media gateway;
   means for setting up the call using the shortcut.

11. The system defined in claim 10, further comprising a plurality of TDM terminations and a plurality of packet terminations for the call in the originating virtual media gateway and in the terminating virtual media gateway.

12. The system defined in claim 11, wherein the switching facilities comprise TDM switching facilities.

13. The system defined in claim 12, wherein the shortcut is between the TDM terminations on the originating virtual media gateway and the TDM terminations on the terminating virtual media gateway.

14. The system defined in claim 11, wherein the switching facilities comprise packet switching facilities.

15. The system defined in claim 14, wherein the shortcut is between the packet terminations on the originating virtual media gateway and the packet terminations on the terminating virtual media gateway.

16. The system defined in claim 10, further comprising means for transporting the shortcut token from the originating virtual media gateway to the terminating virtual media gateway as one of the parameters carried in the SDP message body under H.248 protocol.

* * * * *